United States Patent
Hotelling et al.

(10) Patent No.: US 9,740,343 B2
(45) Date of Patent: Aug. 22, 2017

(54) CAPACITIVE SENSING ARRAY MODULATION

(71) Applicant: Apple Inc., Cupertino, CA (US)

(72) Inventors: Steven P. Hotelling, Los Gatos, CA (US); Jean-Marie Bussat, Mountain View, CA (US); Benjamin B. Lyon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/842,635

(22) Filed: Mar. 15, 2013

(65) Prior Publication Data

US 2013/0271422 A1    Oct. 17, 2013

Related U.S. Application Data

(60) Provisional application No. 61/623,941, filed on Apr. 13, 2012, provisional application No. 61/649,203, (Continued)

(51) Int. Cl.
*G06F 3/044* (2006.01)
*G06F 3/041* (2006.01)
*G06K 9/00* (2006.01)

(52) U.S. Cl.
CPC ............ *G06F 3/044* (2013.01); *G06F 3/0416* (2013.01); *G06K 9/0002* (2013.01)

(58) Field of Classification Search
CPC ...... G06F 3/041; G06F 3/044; G06F 3/03547; G06F 2203/04111; G06F 2203/04103;
(Continued)

(56) References Cited

U.S. PATENT DOCUMENTS 3,876,942 A    4/1975  Koster
4,421,418 A    12/1983 Morishima
(Continued)

FOREIGN PATENT DOCUMENTS

CN    1164075    11/1997
CN    1164076    11/1997
(Continued)

OTHER PUBLICATIONS

International Search Report and Written Opinion, dated Sep. 30, 2013, PCT/US2013/035152, 9 pages.
(Continued)

*Primary Examiner* — Nalini Mummalaneni
(74) *Attorney, Agent, or Firm* — Brownstein Hyatt Farber Schreck, LLP (57) ABSTRACT

A capacitive fingerprint sensor that may be formed of an array of sensing elements. Each capacitive sensing element of the array may register a voltage that varies with the capacitance of a capacitive coupling. A finger may capacitively couple to the individual capacitive sensing elements of the sensor, such that the sensor may sense a capacitance between each capacitive sensing element and the flesh of the fingerprint. The capacitance signal may be detected by sensing the change in voltage on the capacitive sensing element as the relative voltage between the finger and the sensing chip is changed. Alternately, the capacitance signal may be detected by sensing the change in charge received by the capacitive sensing elements as the relative voltage between the finger and the sensing chip is changed.

17 Claims, 5 Drawing Sheets

Related U.S. Application Data filed on May 18, 2012, provisional application No. 61/666,579, filed on Jun. 29, 2012, provisional application No. 61/666,610, filed on Jun. 29, 2012.

(58) Field of Classification Search
CPC . G06F 21/32; G06K 9/00053; G02F 1/13338; H03K 17/962; G01R 27/2605; G01D 5/24; G01D 5/2405
USPC .......... 345/173, 174, 156; 178/18.06, 18.01, 178/18.03; 382/109
See application file for complete search history.

(56) References Cited

U.S. PATENT DOCUMENTS

| | | | |
|---|---|---|---|
| 5,650,597 A † | 7/1997 | Redmayne | |
| 5,731,222 A | 3/1998 | Malloy et al. | |
| 5,953,441 A | 9/1999 | Setlak | |
| 5,963,679 A * | 10/1999 | Setlak | 382/312 |
| 6,011,859 A | 1/2000 | Kalnitsky et al. | |
| 6,049,620 A | 4/2000 | Dickinson et al. | |
| 6,088,471 A | 7/2000 | Setlak et al. | |
| 6,259,804 B1 * | 7/2001 | Setlak et al. | 382/124 |
| 6,327,376 B1 | 12/2001 | Harkin | |
| 6,400,359 B1 | 6/2002 | Katabami | |
| 6,483,931 B2 | 11/2002 | Kalnitsky et al. | |
| 6,522,773 B1 | 2/2003 | Houdeau | |
| 6,628,812 B1 † | 9/2003 | Setlak | |
| 6,647,133 B1 | 11/2003 | Morita | |
| 6,734,655 B1 * | 5/2004 | Javanifard et al. | 323/222 |
| 6,737,329 B2 * | 5/2004 | Lepert et al. | 438/393 |
| 7,290,323 B2 | 5/2004 | Deconde et al. | |
| 6,882,338 B2 | 4/2005 | Flowers | |
| 6,906,529 B2 | 6/2005 | Blanchard | |
| 6,996,492 B1 | 2/2006 | Testoni | |
| 7,042,317 B2 | 5/2006 | Xiao et al. | |
| 7,194,113 B2 | 3/2007 | Greschitz et al. | |
| 7,202,764 B2 | 4/2007 | Deligianni et al. | |
| 7,227,213 B2 | 6/2007 | Mastromatteo et al. | |
| 7,236,765 B2 | 6/2007 | Bonicatto et al. | |
| 7,262,609 B2 | 8/2007 | Reynolds | |
| 7,318,550 B2 | 1/2008 | Bonalle et al. | |
| 7,397,096 B2 | 7/2008 | Chou et al. | |
| 7,403,749 B2 | 7/2008 | Kuijstermans et al. | |
| 7,460,109 B2 | 12/2008 | Safai et al. | |
| 7,521,942 B2 * | 4/2009 | Reynolds | 324/688 |
| 7,536,039 B2 | 5/2009 | Shinoda et al. | |
| 7,548,636 B2 | 6/2009 | Shimamura et al. | |
| 7,627,151 B2 | 12/2009 | Rowe | |
| 7,683,638 B2 | 3/2010 | Chuang et al. | |
| 7,696,497 B2 | 4/2010 | Rogers | |
| 7,757,096 B2 | 7/2010 | Murata et al. | |
| 7,777,501 B2 | 8/2010 | Reynolds et al. | |
| 7,902,474 B2 | 3/2011 | Mittleman et al. | |
| 8,041,083 B2 | 10/2011 | Pai et al. | |
| 8,070,695 B2 | 12/2011 | Gupta | |
| 8,073,204 B2 | 12/2011 | Kramer et al. | |
| 8,093,099 B2 | 1/2012 | Purushothaman et al. | |
| 8,111,136 B2 | 2/2012 | Wong et al. | |
| 8,116,540 B2 | 2/2012 | Dean et al. | |
| 8,174,372 B2 | 5/2012 | da Costa | |
| 8,195,117 B2 | 6/2012 | Bult et al. | |
| 8,243,030 B2 | 8/2012 | Jiang et al. | |
| 8,264,463 B2 | 9/2012 | Takashima et al. | |
| 8,283,934 B2 | 10/2012 | Nishizono | |
| 8,305,360 B2 | 11/2012 | Wu | |
| 8,358,816 B2 | 1/2013 | Sherlock et al. | |
| 8,362,488 B2 | 1/2013 | Chaug et al. | |
| 8,366,633 B2 | 2/2013 | Wolf | |
| 8,456,330 B2 | 6/2013 | Filson et al. | |
| 8,461,948 B2 | 6/2013 | Pulskamp | |
| 8,482,381 B2 | 7/2013 | Chatterjee et al. | |
| 8,482,546 B2 | 7/2013 | Chai et al. | |
| 8,529,474 B2 | 9/2013 | Gupta et al. | |
| 8,598,555 B2 | 12/2013 | Guerrero | |
| 8,606,227 B2 | 12/2013 | Karam et al. | |
| 8,716,613 B2 | 5/2014 | Perezselsky et al. | |
| 8,736,001 B2 | 5/2014 | Salatino et al. | |
| 8,743,082 B2 | 6/2014 | Ganapathi et al. | |
| 8,748,842 B2 | 6/2014 | Ohashi | |
| 8,749,523 B2 | 6/2014 | Pance et al. | |
| 8,779,540 B2 | 7/2014 | Kerness et al. | |
| 8,780,071 B2 | 7/2014 | Chen | |
| 8,791,792 B2 | 7/2014 | Benkley | |
| 8,797,298 B2 | 8/2014 | Brosnan et al. | |
| 8,841,749 B2 | 9/2014 | Joblot et al. | |
| 8,860,683 B2 | 10/2014 | Baumbach | |
| 8,866,347 B2 | 10/2014 | Benkley, III | |
| 9,158,410 B2 | 11/2014 | Hare et al. | |
| 8,907,897 B2 | 12/2014 | Ferren et al. | |
| 9,035,895 B2 | 5/2015 | Bussat et al. | |
| 9,065,321 B2 | 6/2015 | Divan et al. | |
| 9,099,282 B2 | 8/2015 | Rogers et al. | |
| 9,110,538 B2 | 8/2015 | Dunko et al. | |
| 9,135,495 B1 | 9/2015 | Pope et al. | |
| 9,153,490 B2 | 10/2015 | Mitsuhashi et al. | |
| 9,158,403 B2 | 10/2015 | Kasamatsu | |
| 9,158,958 B2 | 10/2015 | Wickboldt et al. | |
| 9,239,655 B2 | 1/2016 | Hershman | |
| 9,268,989 B2 | 2/2016 | Pope et al. | |
| 9,316,677 B2 | 4/2016 | Grunthaner et al. | |
| 9,323,393 B2 | 4/2016 | Djordjev et al. | |
| 9,323,972 B2 | 4/2016 | Bussat et al. | |
| 9,460,332 B1 | 10/2016 | Bussat | |
| 9,551,783 B2 | 1/2017 | Schneider et al. | |
| 9,576,178 B2 | 2/2017 | Pope et al. | |
| 2002/0196036 A1 * | 12/2002 | Toyoshima et al. | 324/702 |
| 2005/0156906 A1 | 7/2005 | Chiu | |
| 2006/0067564 A1 * | 3/2006 | Miyasaka | G06K 9/0002 382/124 |
| 2007/0076923 A1 | 4/2007 | Chiu | |
| 2008/0049980 A1 | 2/2008 | Castaneda et al. | |
| 2008/0238878 A1 | 10/2008 | Wang | |
| 2009/0008729 A1 | 1/2009 | Yang et al. | |
| 2009/0033343 A1 * | 2/2009 | Reynolds et al. | 324/688 |
| 2009/0083847 A1 * | 3/2009 | Fadell et al. | 726/16 |
| 2009/0085879 A1 | 4/2009 | Dai et al. | |
| 2009/0260900 A1 | 10/2009 | Ure | |
| 2010/0110019 A1 | 5/2010 | Ozias et al. | |
| 2010/0156595 A1 | 6/2010 | Wong et al. | |
| 2010/0176271 A1 | 7/2010 | Krim et al. | |
| 2010/0201485 A1 | 8/2010 | Chou | |
| 2010/0219845 A1 * | 9/2010 | Easter | 324/678 |
| 2010/0321159 A1 | 12/2010 | Stewart | |
| 2011/0102569 A1 | 5/2011 | Erhart | |
| 2011/0122082 A1 | 5/2011 | Orellana | |
| 2011/0234623 A1 | 9/2011 | Ure | |
| 2011/0267298 A1 | 11/2011 | Erhart | |
| 2011/0298711 A1 | 12/2011 | Dean et al. | |
| 2012/0085822 A1 † | 4/2012 | Setlak | |
| 2012/0090757 A1 | 4/2012 | Buchan et al. | |
| 2012/0097510 A1 | 4/2012 | Mitchell | |
| 2012/0113044 A1 | 5/2012 | Strazisar et al. | |
| 2012/0127124 A1 * | 5/2012 | Zanone et al. | 345/174 |
| 2012/0152711 A1 | 6/2012 | Silverman | |
| 2012/0242635 A1 | 9/2012 | Erhart et al. | |
| 2012/0267740 A1 | 10/2012 | Okamoto | |
| 2012/0287587 A1 | 11/2012 | Los | |
| 2013/0015868 A1 | 1/2013 | Peng | |
| 2013/0141388 A1 | 6/2013 | Ludwig | |
| 2013/0194071 A1 | 8/2013 | Slogedal | |
| 2013/0231046 A1 | 9/2013 | Pope et al. | |
| 2013/0279769 A1 | 10/2013 | Benkley | |
| 2013/0307818 A1 | 11/2013 | Pope et al. | |
| 2014/0103943 A1 | 4/2014 | Dunlap et al. | |
| 2014/0135597 A1 | 5/2014 | Wolf | |
| 2014/0216914 A1 | 8/2014 | Pope et al. | |
| 2014/0218339 A1 | 8/2014 | Hotelling et al. | |
| 2014/0241595 A1 | 8/2014 | Bernstein | |
| 2015/0002459 A1 | 1/2015 | Watanabe et al. | |
| 2015/0070079 A1 | 3/2015 | Yang et al. | |
| 2015/0071509 A1 | 3/2015 | Myers | |
| 2015/0248574 A1 | 9/2015 | Mrazek et al. | |
| 2016/0004896 A1 | 1/2016 | Pope et al. | |

(56) References Cited

U.S. PATENT DOCUMENTS

| | | |
|---|---|---|
| 2016/0070383 A1 | 3/2016 | Toyoshima et al. |
| 2016/0092714 A1 | 3/2016 | Yazdandoost et al. |
| 2016/0092715 A1 | 3/2016 | Yazdandoost et al. |
| 2016/0092716 A1 | 3/2016 | Yazdandoost et al. |
| 2016/0217311 A1 | 7/2016 | Bhagavat et al. |
| 2016/0278671 A1 | 9/2016 | Bhagavat et al. |
| 2017/0109565 A1 | 4/2017 | Pope et al. |

FOREIGN PATENT DOCUMENTS

| | | |
|---|---|---|
| CN | 1172308 | 2/1998 |
| CN | 1278347 | 12/2000 |
| CN | 1450489 | 10/2003 |
| CN | 1463409 | 12/2003 |
| CN | 1538142 | 10/2004 |
| CN | 1680818 | 10/2005 |
| CN | 1802882 | 7/2006 |
| CN | 101281589 | 10/2008 |
| CN | 101339951 | 1/2009 |
| CN | 101809581 | 8/2010 |
| CN | 101901092 | 12/2010 |
| CN | 202153359 | 2/2012 |
| EP | 0457398 | 11/1991 |
| EP | 0791899 | 8/1997 |
| EP | 0924656 | 6/1999 |
| EP | 1775674 | 4/2007 |
| JP | 2000187420 | 4/2000 |
| JP | 2001339057 | 12/2001 |
| JP | 2001344605 | 12/2001 |
| JP | 2002502518 | 1/2002 |
| JP | 2003298753 | 10/2003 |
| JP | 2004310574 | 11/2004 |
| JP | 2005011672 | 1/2005 |
| JP | 2005115513 | 4/2005 |
| JP | 2005338918 | 12/2005 |
| JP | 2006134144 | 5/2006 |
| JP | 3138518 | 12/2007 |
| JP | 2012083829 | 4/2012 |
| KR | 20080035133 | 4/2008 |
| TW | M327066 U | 2/2008 |
| TW | 200937306 | 9/2009 |
| TW | 201017554 | 5/2010 |
| TW | 201017555 | 5/2010 |
| TW | 201229852 | 7/2012 |
| TW | 201346779 | 11/2013 |
| WO | WO 01/59558 | 8/2001 |
| WO | WO 2004/077340 | 10/2004 |
| WO | WO 2004/098083 | 11/2004 |
| WO | WO 2005/124659 | 12/2005 |
| WO | WO 2014/128249 | 8/2014 |

OTHER PUBLICATIONS

European Search Report dated Dec. 12, 2013, EP 13163827, 8 pages.
Author Unknown, "DC-to-DC converter," Wikipedia, the free encyclopedia, Apr. 12, 2012, XP 055092945, retrieved from the internet on Dec. 11, 2013: URL:http://en.wikipedia.org/w/index.php?title=DC-to-DC__converter&oldid=487061873.
Setlak, Chapter 2: Advances in Fingerprint Sensors Using RF Imaging Techniques, Automatic Fingerprint Recognition Systems, Editor: Ratha et al., 2003, New York, Springer Verlag, US, pp. 27-53, XP002347781, ISBN: 978-0-387-95593-3.
U.S. Appl. No. 14/294,903, filed Jun. 3, 2014, Bhagavat et al.
U.S. Appl. No. 14/335,553, filed Jul. 18, 2014, Bussat et al.
U.S. Appl. No. 14/451,076, filed Aug. 4, 2014, Yousefpor et al.
U.S. Appl. No. 14/481,568, filed Sep. 9, 2014, Bussat.
Netherlands Search Report dated Dec. 12, 2013, NL 2010604, 11 pages.
Evaluation Report for Utility Model Patent dated Jun. 20, 2014, CN ZL2013203260533, 4 pages.
Motorola User Guide, Motorola Atrix™ 4G (MB860), Manual No. 68XXXXX468-A, Motorola Mobility Inc., 2011, 90 pages.
Motorola Atrix (MB860), Manual No. 68014798001-B, Motorola Mobility Argentina S.A., 2011, 68 pages.
U.S. Appl. No. 14/709,388, filed May 11, 2015, Pope et al.
U.S. Appl. No. 14/855,123, filed Sep. 15, 2015, Pope et al.
Australian Office Action dated Feb. 25, 2015, AU 2013204080, 4 pages.
Taiwanese Office Action dated Jan. 23, 2015, TW 102113155, 19 pages.
Australian Office Action dated Oct. 13, 2014, AU 2014100526, 3 pages.
U.S. Appl. No. 15/181,229, filed Jun. 13, 2016, Bhagavat et al.
U.S. Appl. No. 15/018,617, filed Feb. 8, 2016, Pope et al.
Taiwanese Office Action dated Nov. 20, 2015, TW 104119645, 13 pages.
Chinese Office Action dated Nov. 4, 2015, CN 201310224334.2, 11 pages.
Chinese Office Action dated May 23, 2016, CN 201310224334.2, 15 pages.
U.S. Appl. No. 15/393,610, filed Dec. 29, 2016, Pope et al.

\* cited by examiner
† cited by third party

CAPACITIVE SENSING ARRAY MODULATION

CROSS-REFERENCE TO RELATED APPLICATIONS

This application claims the benefit under 35 U.S.C. §119(e) to U.S. Provisional Patent Application No. 61/623,941, which was filed on Apr. 13, 2012, and entitled "Capacitive Sensing Array Modulation," U.S. Provisional Patent Application No. 61/649,203, which was filed May 18, 2012, and entitled "Inductive Boost Circuit and Fingerprint Sensing Systems," U.S. Provisional Patent Application No. 61/666,579, which was filed Jun. 29, 2012, and entitled "Capacitive Sensing Array Modulation," and U.S. Provisional Patent Application No. 61/666,610, which was filed Jun. 29, 2012, and entitled "Capacitive Sensing Array," all of which are incorporated by reference as if fully disclosed herein.

TECHNICAL FIELD

Embodiments described herein relate generally to circuits that may be used to support fingerprint sensing, including boost circuits, such as inductive boost circuits.

BACKGROUND DESCRIPTION

The following terminology is exemplary, and not intended to be limiting in any way. The text "capacitive sensing element", and variants thereof, generally refers to one or more data elements of any kind, including information sensed with respect to individual locations. For example and without limitation, a capacitive sensing element can include data or other information with respect to a relatively small region of a fingerprint image. After reading this application, those skilled in the art would recognize that these statements of terminology would be applicable to techniques, methods, physical elements, and systems (whether currently known or otherwise), including extensions thereof inferred or inferable by those skilled in the art after reading this application.

Fingerprint sensing technology has become widespread in use and is often used to provide secure access to sensitive electronic devices and/or data. Generally, capacitive fingerprint sensors may be used to determine an image of a fingerprint through measuring capacitance through each capacitive sensing element of a capacitive sensor. The higher the capacitance, the nearer the surface of an adjacent or overlying finger to the capacitive sensing element. Thus, fingerprint ridges provide a higher capacitance in an underlying capacitive sensing element than do fingerprint valleys.

Capacitive fingerprint sensors come in at least two varieties, namely active and passive. Active capacitive sensors are often used in electronic devices to provide biometric security and identification of users.

Active capacitive sensors initially excite the epidermis of the sensed finger. Capacitance to the epidermis is measured at each capacitive sensing element. As one example, capacitance may be measured or determined by measuring a capacitive sensing element's voltage and/or charge during a low voltage phase and a high voltage phase of a modulation frequency for the capacitive sensing element array. The difference in voltages may be used to determine capacitance. One example of an active capacitive sensor is shown in FIG. 1.

Figure 1:
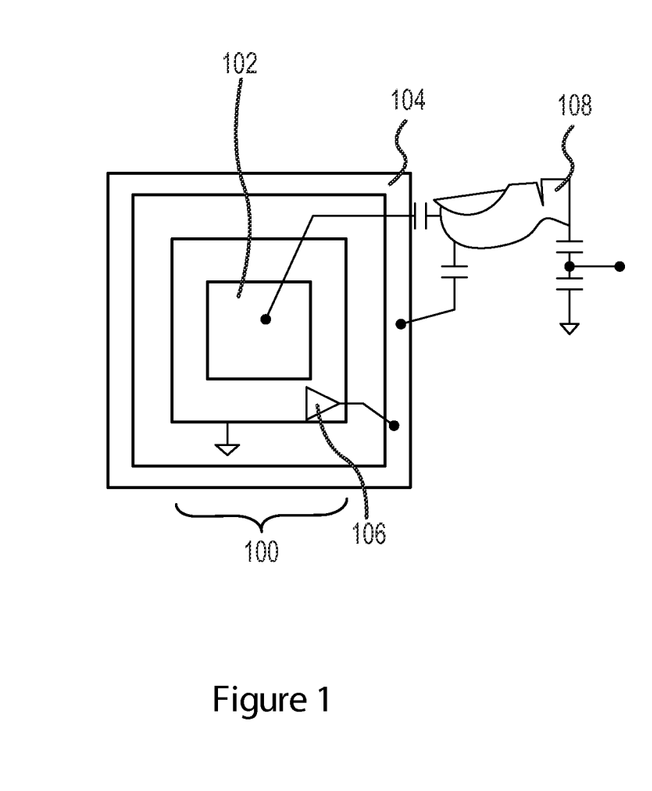
FIG. 1 depicts a block diagram of a sample capacitive sensing array.

As shown in FIG. 1, the active fingerprint sensor may include both capacitive sensing element array 102 on sensor chip 100 and drive ring 104. The voltage of capacitive sensing element array 102 is not directly driven or modulated, but instead drive ring 104 is modulated by drive amplifier 106. This, in turn, excites finger 108 and the voltage and/or charge at each capacitive sensing element of capacitive sensing element array 102 varies as drive ring 104 is modulated since finger's 108 voltage potential changes with the modulation of drive ring 104.

In such a sensor, the voltage that may be applied to the drive ring may be limited. Commonly, the drive ring voltage is no more than 4 volts peak-to-peak. Voltages above this may excite the finger to too high a voltage; this excessive excitation may be detected by a person as a "tingling" or uncomfortable feeling in their finger. Although the exact voltage at which one can sense the tingling varies from person to person, a 4 volt peak-to-peak voltage is generally considered as the threshold beyond which the feeling is noticeable.

Since the drive ring's voltage is restricted to avoid user perception, the thickness of any dielectric overlaying the sensor may also be limited. The thicker the dielectric between sensor pad and finger, the more attenuated the resulting capacitance and the blurrier the fingerprint image becomes. For dielectrics having a thickness or more than approximately 100 microns, the fingerprint image may become unreliable.

Another limitation arises when other parts of the user's finger or hand or body may capacitively couple through earth ground to the system, or directly to the system ground when touching other parts of the system. This capacitive coupling from the user to the system may be highly variable depending on how the user is touching the device. This parasitic coupling attenuates the voltage that the drive ring is able drive into the user's finger, and as such reduces the signal. The attenuation may be highly variable depending on how the user is touching the device.

SUMMARY

Embodiments described herein may take the form of an electronic device, including: a sensor pad comprising an array of individual capacitive sensing elements; a drive ring connected to the sensor pad; and a modulating circuit adapted to control a modulated signal received by the sensor pad while a drive signal received by the drive ring is maintained substantially at a boosted ground exceeding an electronic device ground level.

Still other embodiments may take the form of an electronic device, including: a capacitive sensor comprising: a sensor pad comprising an array of individual capacitive sensing elements; and a drive ring connected to the sensor pad; a first modulating circuit operably connected to the sensor pad, wherein the first modulating circuit is adapted to modulate an input signal to the sensor pad while a drive signal to the drive ring is maintained substantially at a boosted ground exceeding an electronic device ground level; an inductive boost circuit configured to provide a boosted voltage to the sensor pad relative to the electronic device ground level at a higher amplitude than the relative voltage between the drive ring and the electronic device ground; and a housing surrounding the first modulating circuit and inductive boost circuit.

Yet other embodiments may take the form of a method for operating a capacitive sensor, wherein the capacitive sensor includes a sensor pad comprising an array of individual capacitive sensing elements and a drive ring connected to the sensor pad, the method comprising: during a scanning state, modulating one or more input signals to the sensor pad while maintaining a drive signal to the drive ring substantially at a system ground level; and during an idle state, maintaining the one or more input signals to the sensor pad substantially at a boosted ground exceeding the system ground level.

Still other embodiments may take the form of a method for operating a capacitive sensor, wherein the capacitive sensor includes a sensor pad comprising an array of individual capacitive sensing elements and a drive ring operably connected to the sensor pad, the method comprising: initiating a scanning operation and transitioning a drive signal to the drive ring to a system ground level; reading a first signal from a capacitive sensing element when an input signal to the sensor pad is in a low state and the drive signal to the drive ring is maintained substantially at the system ground level; and reading a second signal from the capacitive sensing element when the input signal to the sensor pad is in a high state and the drive signal to the drive ring is maintained substantially at a boosted ground exceeding the system ground level.

DETAILED DESCRIPTION

Generally, embodiments discussed herein may take the form of a capacitive sensor, such as a fingerprint sensor. The sensor may be formed from a capacitive sensing element array; each capacitive sensing element of the array may register a voltage that varies with the capacitance of a capacitive coupling. A finger may capacitively couple to the individual capacitive sensing elements of the sensor, such that the sensor may sense a capacitance between each capacitive sensing element and the flesh of the fingerprint. The capacitance signal may be detected by sensing the change in voltage on the capacitive sensing element as the relative voltage between the finger and the sensing chip is changed. Alternately, the capacitance signal may be detected by sensing the change in charge received by the capacitive sensing elements as the relative voltage between the finger and the sensing chip is changed. Portions of the finger further away from the sensor may create a lower capacitance between the sensor and finger, and thus a lower signal on underlying capacitive sensing elements. By contrast, portions of the finger closer to the sensor may create a higher capacitance between sensor and finger, and thus higher signals on underlying capacitive sensing elements. Thus, capacitive sensing elements underlying ridges of a fingerprint may register higher signals while capacitive sensing elements underlying valleys of the fingerprint may register a lower capacitance and lower signals.

The fingerprint sensor may include both a sensor pad and a drive ring. Both the sensor pad and drive ring may be placed beneath a dielectric, such that the finger does not directly touch either the sensor pad or drive ring but instead comes into contact with the interposed dielectric. In some examples, the finger may contact the drive ring.

The difference in signals at the sensor capacitive sensing elements may be used to map a fingerprint. The resolution of the sensor may vary with capacitive sensing element density, distance between the sensor pad's surface and the finger, and thickness of a dielectric covering the sensor pad. Generally, as the dielectric increases in thickness, the capacitance between the finger and sensor grows increasingly attenuated, and so the signal differences may attenuate, as well. Certain embodiments may address this attenuation by applying a higher, less variable, relative voltage change between the finger and the sensor pad, leading to a higher detectable signal at the sensor, as described in more detail herein.

By driving a higher voltage to the sensor, the capacitive coupling between the sensor and finger may compensate for the thickness of the dielectric. By increasing the voltage in this fashion, the capacitance between finger and capacitive sensing elements of the sensor pad may be increased, thereby obtaining better resolution and imaging of the fingerprint. The sensor may be driven at a higher voltage, such as 12 volts peak-to-peak, 16 volts peak-to-peak, or even more, without inducing any physical sensation in the finger or hand of a user. This may be accomplished by maintaining the drive ring's voltage at a system ground voltage, while the sensor array is modulated with the higher peak-to-peak voltage signal.

By driving a voltage to the sensor relative to system ground, while maintaining the drive ring's voltage at system ground, minimizes the issue of signal attenuation due to the highly variable capacitive coupling between the user and the system ground as a result of other fingers, hands, or body parts coming in contact with other parts of the device.

Figure 2:
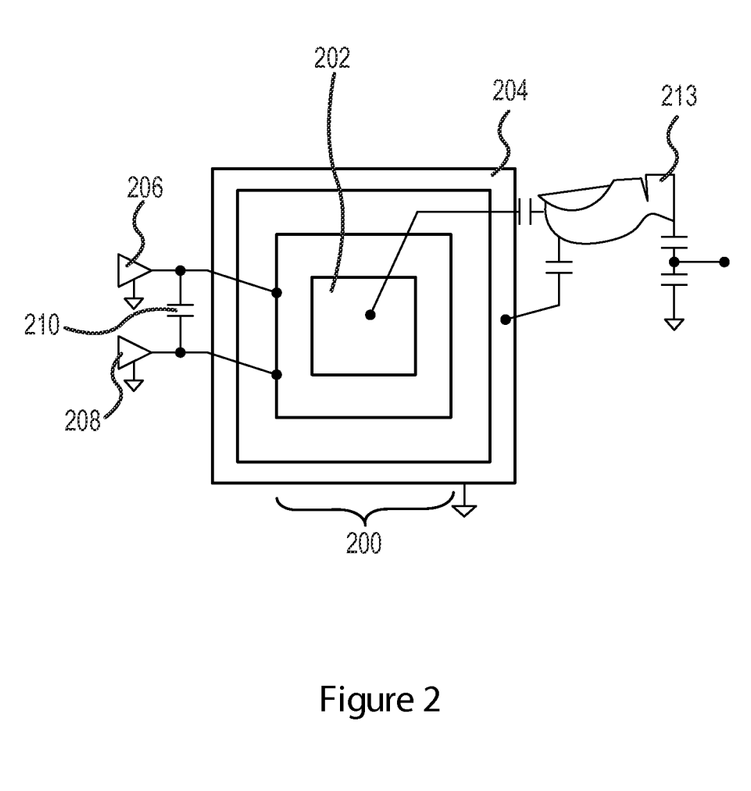
FIG. 2 depicts a block diagram of an embodiment of a capacitive sensing array, as described herein.

FIG. 2 depicts one sample embodiment of a fingerprint sensor. Sensor 200 may include sensor pad 202 formed by an array of individual capacitive sensing elements. Although sensor pad 202 is shown, the individual capacitive sensing elements are omitted for purposes of clarity. As previously mentioned, each capacitive sensing element may be capacitively coupled to a portion of finger 212 overlying that capacitive sensing element; the distance between the overlying finger portion and capacitive sensing element determines the capacitance between the two and thus the signal registered at the capacitive sensing element. As distance decreases, signal increases. Each capacitive sensing element is also capacitively coupled to other adjacent overlying finger portions, and as the distance increases, this leads to a blurring effect, which reduces the total signal difference between capacitive sensing elements directly under finger ridges and finger valleys.

The fingerprint sensor may also include drive ring 204. Drive ring 204 may be maintained at a system ground voltage, rather than an absolute or earth ground.

The fingerprint sensor may also include first and second drive amplifier 206 and 208, as depicted in FIG. 2. First drive amplifier 206 may drive a sensor integrated circuit that includes sensor pad 202, such as an application-specific integrated circuit (ASIC) with a modulating voltage, to induce relative voltage between sensor pad 202 and user finger 212. Second drive amplifier 208 may, provide voltage and current to the sensor integrated circuit, so that the sensor integrated circuit can operate from the relative voltage difference between first and second drive amplifiers 206 and 208. Second drive amplifier 208 may supply a modulating voltage in sync with first drive amplifier 206, such that the relative voltage between the outputs of the first and second amplifiers is approximately constant. The first and second drive amplifiers may be connected by capacitor 210, which can help amplifiers 206 and 208 keep the relative voltage between the first and second drive amplifier outputs constant.

Figure 3:
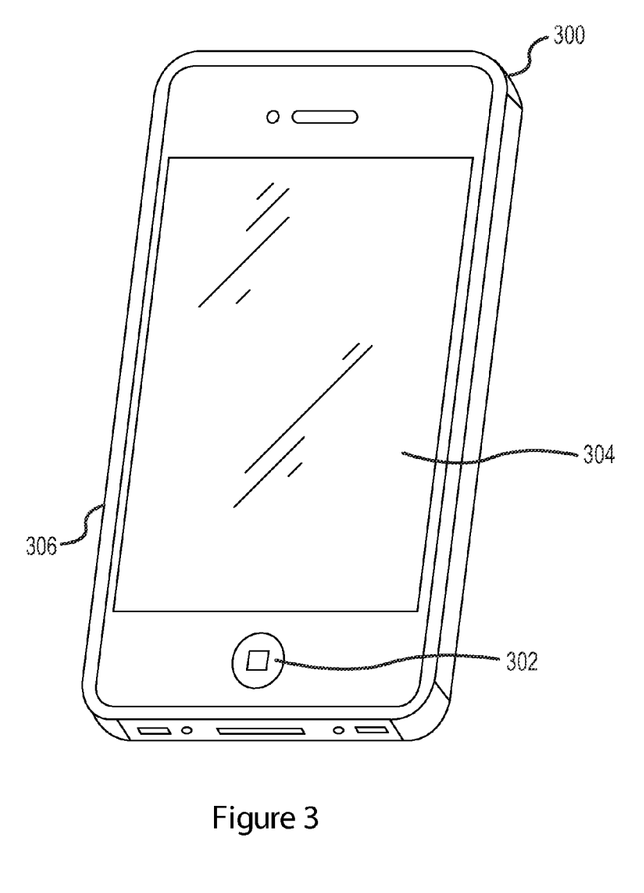
FIG. 3 depicts a sample electronic device incorporating the embodiment of a capacitive sensing array.

FIG. 3 depicts electronic device 300 that may incorporate a fingerprint sensor, such as that shown in FIG. 2. Electronic device 300 may be a mobile telephone, a tablet computing device, a notebook computer, a personal digital assistant, a desktop computer, a portable media player, and the like. The sensor pad may be placed below an input mechanism, such as button 302 of electronic device 300. The sensor pad may alternatively be placed beneath a portion of display screen 304 of electronic device 300, beneath sidewall 306 or other portion of the device's enclosure, and the like. Essentially, any portion of the electronic device's enclosure may house the fingerprint sensor.

In some embodiments, a fingerprint sensor chip (including both sensor pad and drive ring) may be positioned beneath the button 302. An ink layer and/or adhesive may be placed between the button's bottom surface and the sensor chip's top surface. The adhesive may bond the chip to the button, for example. One or more solder balls may affix the fingerprint sensor chip to a flex conductor. The solder balls may generally be placed near the center of the fingerprint sensor chip to reduce the likelihood of cracking due to stress.

In still other embodiments, a number of fingerprint sensors as described herein may be employed in a single electronic device. For example, the fingerprint sensors may be arranged beneath a cover glass or outer surface of an electronic device. In some embodiments, the sensors may be arranged in an array or other ordered pattern. In other embodiments, the sensors may be placed randomly or semi-randomly beneath the surface. In still other embodiments, the sensors may be placed within or beneath a display stack of an electronic device incorporating a display, such as a mobile phone, tablet computing device, computer display screen, and the like. In such embodiments, the sensor(s) may capacitively sense a fingerprint through the display and/or cover glass of the display.

Further, in such embodiments, a portion of the device enclosure or frame may serve as a ground ring as described herein. Multiple sensors may share a ground ring in such a configuration. For example, if the mobile device may capacitively sense touch, the device may activate a fingerprint sensor at, under or near the location at which a touch was sensed. In some embodiments, only fingerprint sensors corresponding to the touch location may be activated while others remain inactive. The ground ring (e.g., portion of the housing, such as sidewall 306) may be coupled to the active fingerprint sensor to obtain a fingerprint or partial fingerprint and operate as generally described herein.

As yet another option, one or more fingerprint sensors may be placed outside of the display area 304 but beneath a surface of the electronic device 300. For example, one or more sensors may be located in a chin (e.g., a region below the display 304, such as the area around button 302) or a forehead (e.g., a region above the display 304) of the electronic device 300.

In some embodiments, flex circuit may extend from the input mechanism stack-up and connect the sensor chip to a signal provider chip that may facilitate modulating the voltage and/or operating frequency of the fingerprint sensor chip. In some examples, the signal provider chip and fingerprint sensor chip may be provided as a single chip or distributed amongst a different number of chips. External components may also be used. As one example, an ASIC may be used as the signal provider chip. The ASIC may also communicate data to and from a processor of the electronic device.

Figure 4:
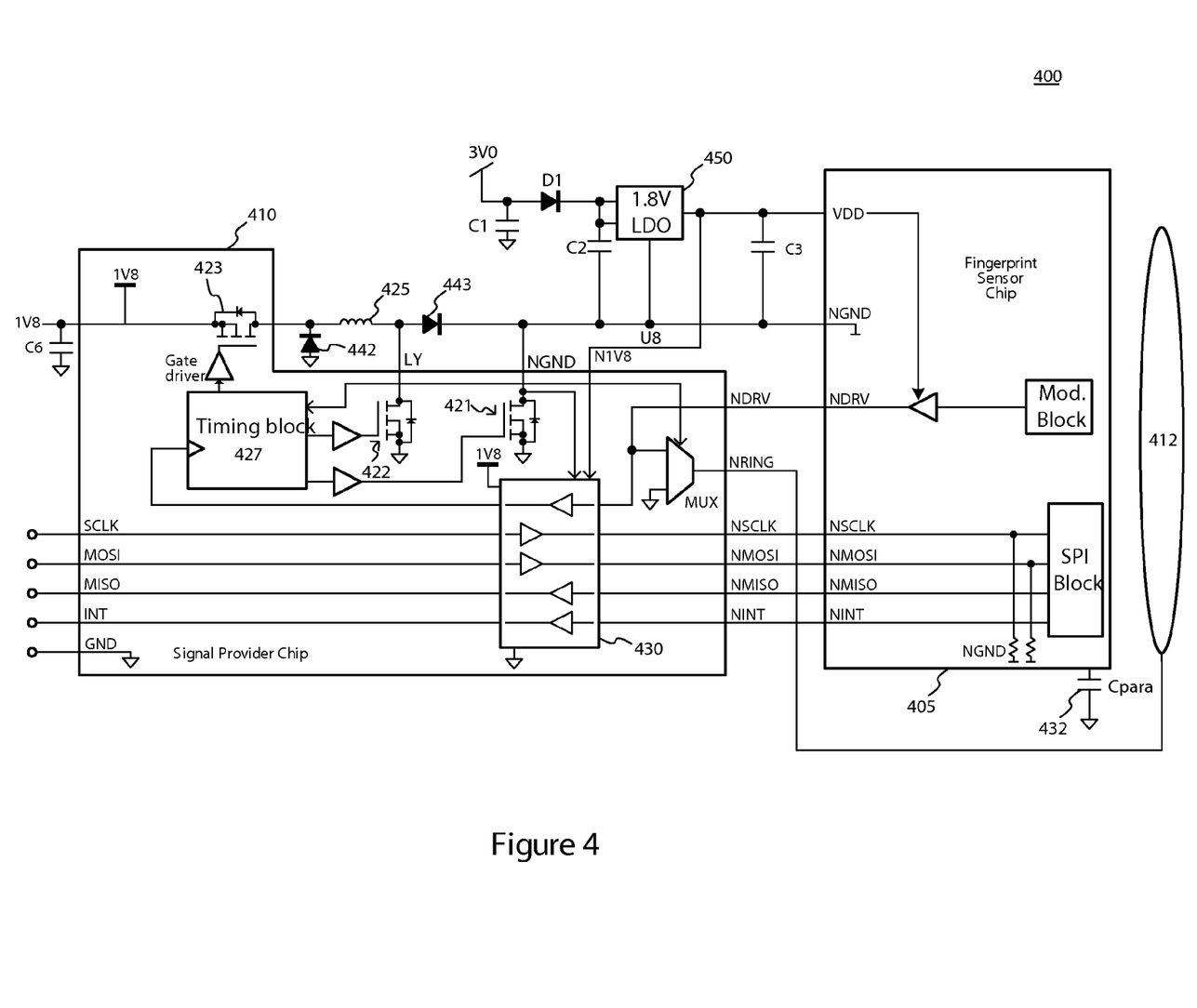
FIG. 4 is a schematic illustration of a fingerprint sensing system according to an embodiment.

FIG. 4 is a schematic illustration of a fingerprint sensing system according to an embodiment. The fingerprint sensing system 400 includes a fingerprint sensor chip 405 and a signal provider chip 410. A drive ring 412 is also shown. During operation, the sensor provided by the fingerprint sensor chip may be modulated using a higher voltage, e.g. 16V peak-to-peak, while the drive ring 412 may be held at a system ground voltage. The system ground voltage may be provided by the signal provider chip 410 and is shown as NRING in FIG. 4. The 16V peak-to-peak signal may be provided by the signal provider chip 410, and is shown as NGND in FIG. 4.

General operation of the fingerprint sensing system shown in FIG. 4 will now be discussed. It is to be noted that in alternative embodiments certain components shown in FIG. 4 may be omitted, others added, or both. The distribution of components as between external components, the fingerprint sensor chip, and the signal provider chip may also be different in other embodiments. Conceptually, a sensor pad (not shown in FIG. 4) may be integrated into or coupled to the fingerprint sensor chip 405. The capacitive sensing element array may capacitively couple to a finger of a user's hand.

The capacitive sensing element array may be modulated at a variety of frequencies. The capacitive sensing element array may measure the voltage of all capacitive sensing elements during a high voltage and again during a low voltage. That is, voltages supplied to the capacitive sensing element array and/or the sensor chip ground voltage, may generally resemble a square wave, although in alternative embodiments the voltage may take other wave shapes. A modulator (labeled "mod. block" in FIG. 4) may control the modulation or oscillation of the capacitive sensing element array and/or the sensor chip ground voltage in accordance with a clock signal, NDRV in FIG. 4. The difference between the capacitive sensing element voltages and/or charges, as measured during the high and low portions of the modulation cycle, permits the chip to determine the capacitance between each capacitive sensing element and overlying portion of the finger and thus the capacitance. From the capacitance with each capacitive sensing element, the fingerprint may be sensed, measured and reconstructed as known to those skilled in the art and generally discussed above.

The signal provider chip 410 may provide a modulated high voltage signal (e.g. 16V peak-to-peak) to the fingerprint sensor chip 405 for use in modulating the sensor. While 16V is used here as an example, in other examples different voltages may be used, including voltages greater than 4V in some examples, greater than 6V in some examples, greater than 8V in some examples, greater than 10V in some examples, greater than 12V in some examples, greater than 14V in some examples, and greater than 16V in some examples. The signal provider chip 410 may further provide a ground voltage, shown as NRING in FIG. 4 to the drive ring 412. Other voltages for NRING may be used in other examples, including 4V, less than 4V, less than 2V, or negative voltages. In some examples, the drive ring 412 may be kept at a voltage that may not be felt by a user touching the drive ring 412 but that has a sufficient difference in magnitude from the voltage provided to the sensor (e.g.

NGND) to provide suitable signal-to-noise ratio for fingerprint sensing. In one example, that difference in magnitude is 16V, with the sensor voltage provided being 16V and the drive ring held at a ground voltage.

Example components of the fingerprint sensing system 400 used to form an inductive boost circuit to provide the NGND signal (which may be, e.g. 16V) will now be described. Reference will be made to transistors 421, 422, and 423, inductor 425, timing block 427, diode 442, diode 443, and level translators 430. A clock signal, e.g. NDRV of FIG. 4, may be received by the timing block 427. The clock signal may be provided to a level translator 430 prior to receipt by the timing block 427 in some examples. The level translator 430 may function to change a magnitude of the clock signal in some examples where, e.g. the timing block may operate in a different supply power domain than the fingerprint sensor chip 405. The timing block 425 may output respective versions of the clock signal (e.g. NDRV) to the gates of the transistors 421, 422, and 423. The respective versions of the clock signals may be delayed varying amounts as applied by the timing block 427. For example, the timing block may include one or more delay circuits configured to delay the clock signal (e.g. NDRV) prior to providing a delayed signal to the transistors 421, 422, and/or 423.

The transistor 423 may serve as a pass transistor. For example, the transistor 423 may turn on when a clock signal, e.g. NDRV, is provided to the timing block 427. Accordingly, the signal provided by the timing block to a gate of the transistor 423 may be indicative of the presence or absence of a clock signal (e.g. NDRV). In this manner, the transistor 423 may be turned on when the fingerprint sensor chip 405 is active and may be turned off when the fingerprint sensor chip 405 is inactive. The signal provided by the timing block 427 to the gate of the transistor 423 may be provided through an optional gate driver circuit as shown. When the transistor 423 is turned on, a supply voltage (e.g. 1.8 V in some examples) may be provided to the inductor 425, to allow the inductor 425 to store energy. The inductor may charge capacitor 432 to a boosted voltage, e.g. a voltage greater than the power supply voltage. In some examples, the inductor provides a boosted voltage of 16 V. In some embodiments, capacitor 432 can be implemented as a physical component of the system, in some embodiments the capacitor 432 may be implemented as the parasitic capacitance of the fingerprint sensor 405 to the environment and the system ground, and combinations of these may be used in some embodiments.

The transistor 421 may function to chop a voltage provided by the inductor 425 at a frequency expected by the fingerprint sensor chip 405, such as 2 MHz in some examples. In some examples, the transistor 421 may chop the voltage at a same frequency as the clock signal, e.g. NDRV. When the transistor 421 is off, the voltage NGND may be a boosted power supply voltage developed by the inductor 425, e.g. 16V. When the transistor 421 is on, the current flowing in the inductor 425 may find a path to ground, and the voltage NGND may transition to ground. Accordingly, the transistor 421 may be switched at a particular frequency to achieve a shaped 16V peak-to-peak waveform. Other peak voltages may also be used. In some examples, the switched frequency is the same as the frequency of the clock signal, e.g. NDRV. Accordingly, the timing block 427 may delay the clock signal, e.g. NDRV, a particular amount and provide a delayed clock signal (e.g. delayed NDRV) to a gate of the transistor 421. The amount of delay may be related to the desired NGND voltage. In one example, the delay is 25 ns when a 2 MHz clock is used. In this manner, the NGND signal provided at the node labeled NGND may be a boosted (e.g. 16 V) square wave signal at a frequency of 2 MHz. Other frequencies and voltages may be used.

In some examples, it may be disadvantageous to have the inductor 425 coupled directly to the node providing NGND. For example, the inductor 425 may then be coupled to parasitic capacitances, shown in FIG. 4 as $C_{para}$ 432. The parasitic capacitances may represent, for example, capacitance between the fingerprint sensor chip 405 and ground, and may include capacitances through a body of the user touching the fingerprint sensor. When the inductor 425 is coupled to the parasitic capacitance 432, oscillation of the boosted voltage (e.g. NGND) signal may occur. To minimize or remove oscillations, the transistor 422 may be provided. When turned on, the transistor 422 may advantageously divert the current from the inductor 423 to damp oscillations which otherwise may occur. Accordingly, the timing block 427 may provide a version, which may be a delayed version, of the clock signal (e.g. NDRV) to the gate of the transistor 422. The clock signal (e.g. NDRV) may be delayed by the timing block 427 an amount sufficient such that when the transistor 422 turns on, the voltage NGND has already reached the target voltage (e.g. 16V).

In this manner, an inductive boost circuit may be used to provide a boosted voltage (e.g. 16 V) at the node labeled NGND in FIG. 4 (after the diode 443). The boosted voltage may be provided to the fingerprint sensor chip 405 for use in modulating the sensor. The boosted voltage itself may be provided as a modulated signal having a frequency, which may be the same as a frequency of the system clock signal (e.g. NDRV).

The low dropout regulator (LDO) 450 may provide a constant supply voltage to the fingerprint sensor chip (e.g. 1.8V). This voltage is provided respectively to the node NGND which can be at the system ground voltage or the boosted voltage.

The four communication lines labeled SCLK, MOSI, MISO and INT generally permit data to be transferred to and from the fingerprint sensor chip. The signals may be provided through the level translator 430. In the fingerprint sensor chip 405, the communication lines are referenced to the sensor ground NGND that is different from the system ground. The level translator may allow for communication to happen between the NGND referenced fingerprint sensor chip and the system ground (GND) referenced device processor. The communication may happen synchronously or asynchronously with the modulation signal NDRV. During the communication, the node NGND can be at the system ground voltage or at the boosted voltage.

SCLK is the serial communication clock and may be used for timing operations.

The MISO line may be used for master/slave transmission of data from a slave to a master. In the present embodiment, the fingerprint sensor chip may be the slave, while a processor associated with the electronic device incorporating the sensor may be the master. Likewise, the MOSI line may be used for sending data from the master (e.g., device processor) to the slave (e.g., fingerprint sensor chip).

The INT line may be used for interrupts. The fingerprint sensor chip may use the INT line to provide a signal indicating to the device processor that the fingerprint sensor chip has completed a task or that the fingerprint sensor chip has some fingerprint data ready to be transferred.

During an idle state, the fingerprint sensor chip 405 may operate in a relatively low-power state. When the chip detects a finger positioned above the capacitive sensing element array, it may initiate a scanning operation. The chip may detect a nearby finger by measuring a capacitance change of one or more capacitive sensing elements of the array relative to its ground, as one example. This may cause the chip to begin a scanning operation. The scanning operation generally may include reading the voltage or charge of one or more of the capacitive sensing elements during a low-voltage state of the array or sensor chip ground, driving the array or sensor chip ground to a high voltage and again reading the voltage or charge of one or more of the capacitive sensing elements. The scanning operation may alternately include reading the voltage or charge of one or more of the capacitive sensing elements during a high-voltage state of the array or sensor chip ground, driving the capacitive sensing element array or sensor chip ground to a low voltage and again reading the voltage or charge of one or more of the capacitive sensing elements. The capacitive sensing elements may be modulated at a relatively high frequency between the low and high voltage states by the modulator. In some embodiments, the chip may operate at a two megahertz frequency, although other embodiments may employ higher or lower frequencies.

It should be appreciated that the drive ring may not be modulated with the capacitive sensing element array. Rather, the drive ring's potential may remain constant at system ground or very near to system ground. This may help prevent or reduce excitation and/or modulation of the finger, which in turn permits the use of higher voltages to drive the capacitive sensing element array.

Further, in embodiments where the fingerprint sensor is incorporated into a hand-held device such as the mobile device of FIG. 3, other fingers of the user's hand may be in contact with a metal portion, or other conductive portion, of the enclosure. The enclosure generally is also at system ground, so contact between conductive elements on the enclosure and the user's hand facilitate driving or maintaining the voltage of the sensed finger to system ground. The "sensed finger" is the finger overlaying the sensor pad, or the finger being imaged by the fingerprint sensor. Maintaining the sensed finger at or near system ground may enhance resolution of the fingerprint image and assist in preventing modulation of the finger.

Figure 5:
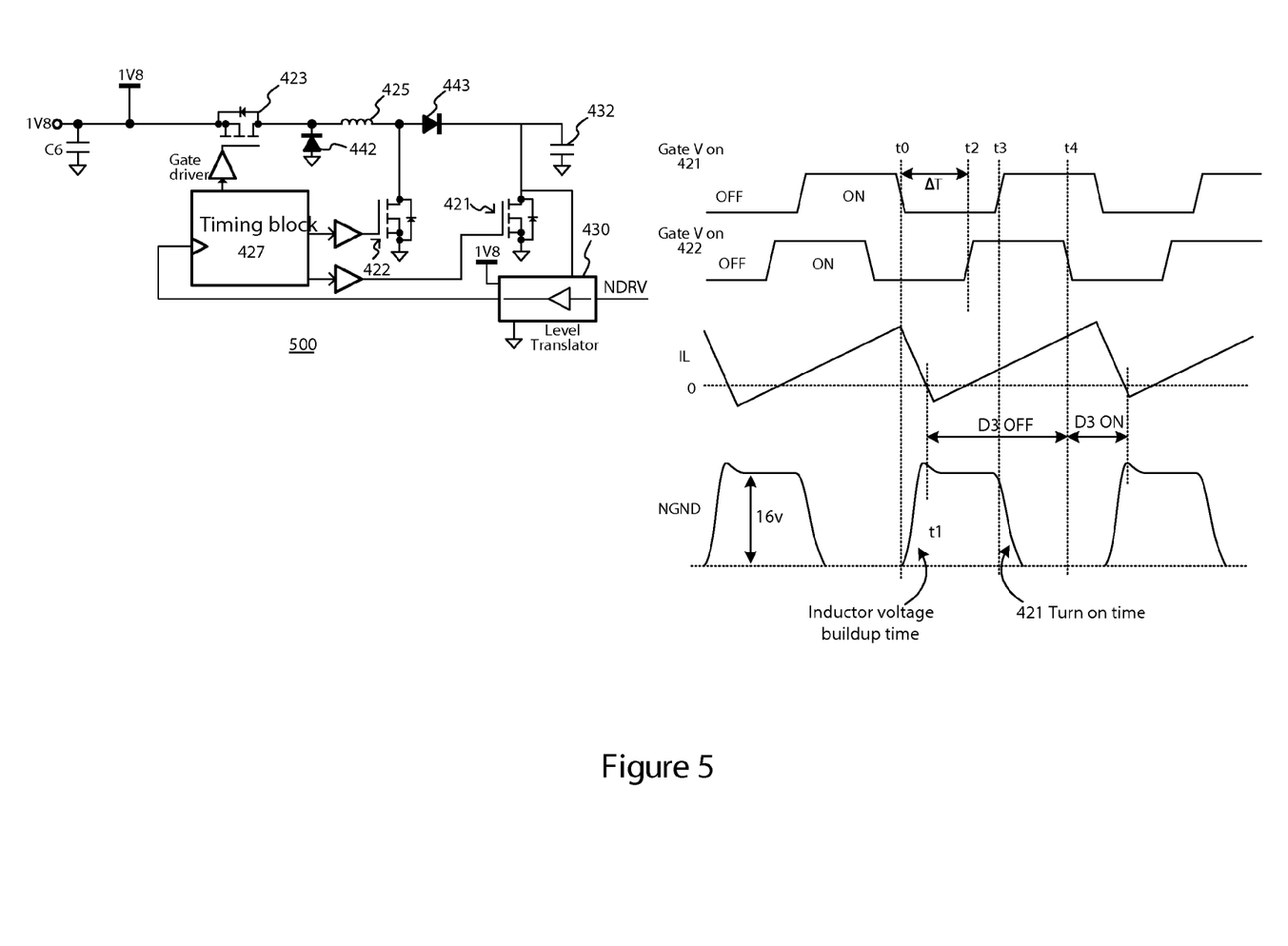
FIG. 5 is a schematic illustration of an inductive boost circuit in accordance with an embodiment, together with a timing diagram showing example operation of the inductive boost circuit.

FIG. 5 is a schematic illustration of an inductive boost circuit in accordance with an embodiment, together with a timing diagram showing example operation of the inductive boost circuit. The inductive boost circuit 500 is the same used in the fingerprint sensing system 400 of FIG. 4, and like components are labeled with like reference numbers, the details of which are not repeated here for brevity. Operation of the inductive boost circuit 500 will be described with reference to the timing diagram shown in FIG. 5 for added clarity. As discussed above, the transistor 423 may function as a pass transistor that may be on whenever an active clock signal (e.g. NDRV) is present. Accordingly, for the purposes of discussion of FIG. 5, the transistor 423 is assumed ON during operations described with reference to FIG. 5. Similarly, the diode 442 may be used only when transistor 423 turns off following a fingerprint scan. Accordingly, the diode 442 is assumed OFF during described operations with reference to FIG. 5.

At time $t_0$, the transistor 421 may turn off (e.g. the gate voltage shown in the trace related to transistor 421 of FIG. 5 may transition low, turning the transistor 421 off). When the transistor 421 is turned off, the inductor current $I_L$ decreases as the voltage at node NGND begins to rise to the boosted voltage (e.g. 16V) as shown in the timing diagram traces labeled $I_L$ and NGND. The voltage of NGND may peak at time $t_1$, as shown, where $t_1$ may represent an inductor voltage buildup time following $t_0$. At time $t_1$, then, the diode 443 may turn off, not allowing current to flow through the diode 443 to capacitor 432, and thus maintaining the voltage on NGND.

At time $t_2$, the transistor 422 may turn on (e.g. the gate voltage shown in the trace related to transistor 422 of FIG. 5 may transition high, turning the transistor 422 on). This may allow damping through the transistor 422 to prevent or reduce oscillations in NGND. At time $t_3$, the transistor 421 may be turned on (e.g. the gate voltage shown in the trance related to transistor 421 of FIG. 5 may transition high, turning the transistor 421 on). When the transistor 421 is turned on, the voltage NGND may be returned to ground as the capacitor 432 is discharged through the transistor 421. Accordingly, the NGND signal falls back to ground starting at time $t_3$.

At time $t_4$, the transistor 422 is turned off (e.g. the gate voltage shown in the trace related to transistor 422 of FIG. 5 may transition low, turning the transistor 422 off). The diode 443 may accordingly turn on, allowing current to flow, but since the transistor 421 remains on, the current may not charge the node NGND until the transistor 421 is again turned off.

Figure 6:
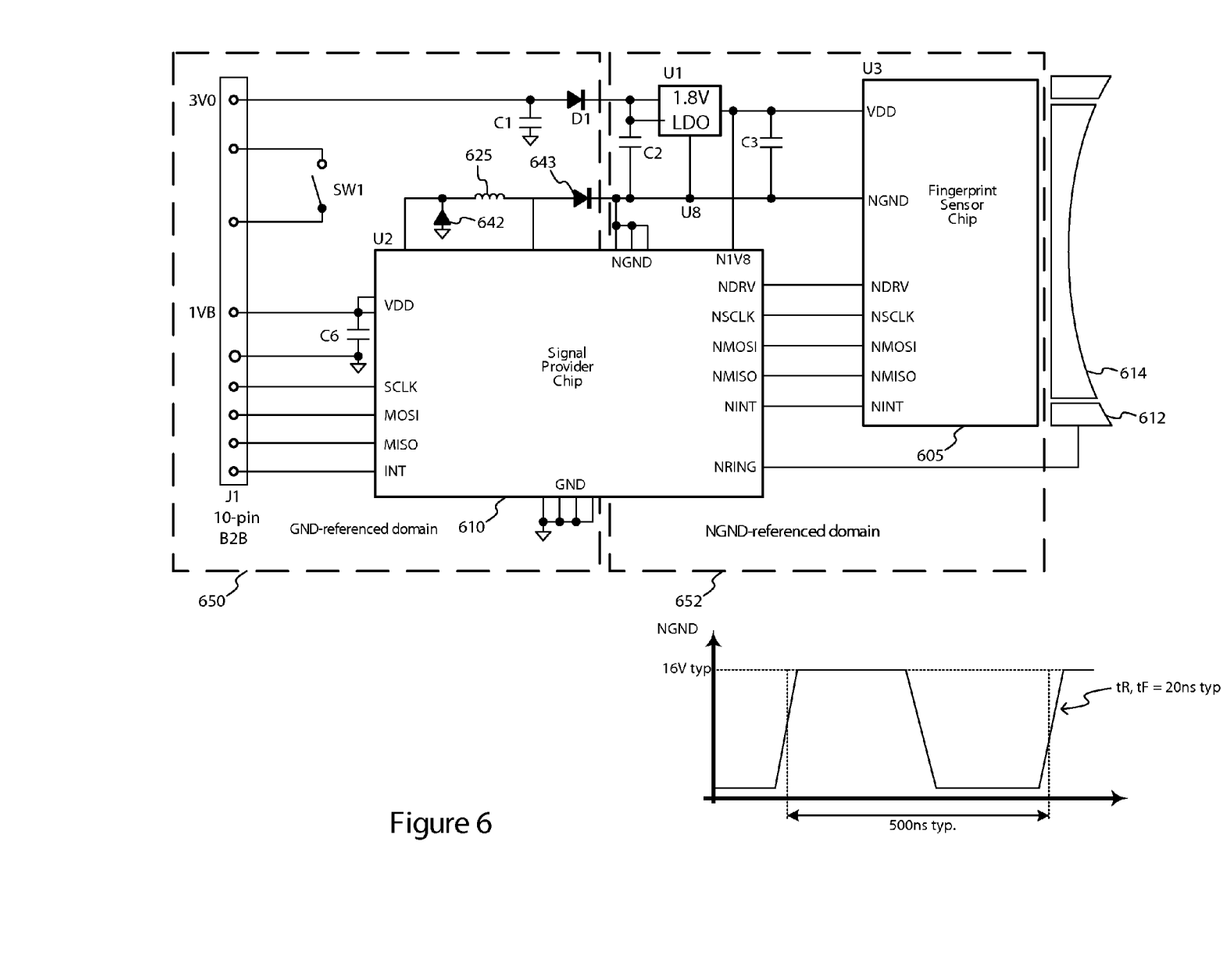
FIG. 6 is a schematic illustration of another fingerprint sensing system in accordance with an embodiment.

FIG. 6 is a schematic illustration of another fingerprint sensing system in accordance with an embodiment. The fingerprint sensing system 600 includes a fingerprint sensor chip 605, and a signal provider chip 610, which may be implemented using the fingerprint sensor chip 405 and signal provider chip 410 of FIG. 4, respectively. Drive ring 612 and fingerprint receiving surface 614 are also shown. External components inductor 625 and diodes 642 and 643 are shown which may be used by the signal provider chip 610 in providing a boosted voltage (e.g. NGND) during fingerprint scans. The inductor 625 and diodes 642 and 643 may be implemented using the inductor 425 and diodes 442 and 443 of FIG. 4, and the signal provider chip may include remaining components of the inductive boost circuit 500 of FIG. 5, for example. In FIG. 6, attention is drawn toward the power domains that may be used for each of the respective chips and result from the operation of the booster circuit in the signal provider chip 610.

For example, two domains are shown GND-referenced domain 650 and NGND-referenced domain 652. In the GND-referenced domain, operations may occur using a system ground (GND). In the NGND-referenced domain, operations may occur using a boosted ground (NGND). The boosted ground signal (e.g. NGND) may only be boosted at particular times, such as during a scan. Moreover, as described above, the boosted ground signal (e.g. NGND) may be modulated such that it has a frequency, which frequency may equal a frequency of a clock signal used by the system (e.g. NDRV). By raising the ground potential used by the fingerprint sensor chip 605, signal-to-noise ratio of fingerprint scans may be improved without impact or with minimal impact to a user experience (e.g. tingling of the finger may not be induced since the boosted voltage is not provided to the drive ring 612, and therefore a user's finger). Furthermore, the fingerprint receiving surface 614 may be made of an insulating material preventing the finger from being in contact with the sensor chip 605 and affected by the boosted voltage. Accordingly inputs to the fingerprint sensor chip 605 may be referenced against NGND, and not system ground.

Although embodiments have been described herein with respect to particular configurations and sequences of operations, it should be understood that alternative embodiments may add, omit, or change elements, operations and the like. Accordingly, the embodiments disclosed herein are meant to be examples and not limitations.

We claim:
1. An electronic device, comprising:
a capacitive sensor comprising:
  a sensor pad comprising an array of individual capacitive sensing elements, the sensor pad configured to receive:
    a sensor pad ground reference voltage greater than earth ground; and
    a sensor pad supply voltage;
  a ring surrounding the sensor pad and maintained at a system ground reference voltage, the ring elevated with respect to the sensor pad and configured for direct contact by user's fingertip; and
  a dielectric entirely covering the sensor pad and positioned within the ring;
a modulating circuit operably connected to the sensor pad and adapted to modulate the sensor pad supply voltage relative to the sensor pad ground reference voltage;
a inductive boost circuit configured to provide the sensor pad ground reference voltage to the sensor pad; and
a housing surrounding the modulating circuit and the inductive boost circuit; wherein:
the sensor pad ground reference voltage is greater than the system ground.

2. The electronic device as in claim 1, wherein:
the modulating circuit is a first modulating circuit; and
the capacitive sensor further includes a second modulating circuit operably connected to the first modulating circuit, wherein the second modulating circuit adapted to modulate the sensor pad ground reference voltage.

3. The electronic device as in claim 1, further comprising a button operably connected to the housing and coupled to the sensor pad.

4. The electronic device as in claim 3, wherein the ring is positioned around the button.

5. The electronic device as in claim 1, further comprising a display surface defined in the housing; wherein the sensor pad is located beneath the display surface.

6. The electronic device as in claim 1, wherein:
the sensor pad is one of a plurality of sensor pads; and
each of the plurality of sensor pads is located beneath a display surface.

7. The electronic device as in claim 1, further comprising:
a display affixed to the housing;
a non-display area adjacent to a display surface and adjacent to a sidewall of the housing; wherein
the sensor pad is located beneath the non-display area.

8. An electronic device, comprising:
a sensor pad comprising an array of individual capacitive sensing elements and configured to receive a sensor pad ground reference voltage and a sensor pad supply voltage;
a dielectric positioned over the sensor pad configured for direct contact by a user's fingertip;
a ring surrounding the sensor pad and configured for direct contact by the user's fingertip, the ring maintained at a system ground reference voltage; and
a modulating circuit adapted to control the sensor pad supply voltage and to maintain the sensor pad supply voltage relative to the sensor pad ground reference voltage; wherein
the sensor pad ground reference voltage exceeds the system ground reference voltage; and
the system ground reference voltage is greater than earth ground.

9. The electronic device of claim 1, wherein the ring is elevated with respect to the dielectric.

10. The electronic device of claim 1, wherein a relative voltage difference between the user's fingertip and the sensor pad supply voltage is greater than four volts.

11. A method for operating a capacitive sensor, wherein the capacitive sensor includes a sensor pad comprising an array of individual capacitive sensing elements, a dielectric positioned over the sensor pad, and a ring that is adjacent to, surrounds and is in an elevated position with respect to the sensor pad, the method comprising:
during a scanning state and when the ring is directly contacted by user's fingertip, modulating a sensor pad supply voltage and a sensor pad ground reference voltage received by the sensor pad while maintaining the ring at a system ground level greater than earth ground; and
during an idle state, maintaining the supply voltage received by the sensor pad at a boosted ground that exceeds the system ground level; wherein
the sensor pad ground reference voltage is boosted with respect to the system ground level.

12. The method as in claim 11, further comprising modulating the ring during the idle state.

13. A method for operating a capacitive sensor, wherein the capacitive sensor includes a sensor pad comprising an array of individual capacitive sensing elements, a dielectric covering the sensor pad, and a ring that surrounds and is elevated with respect to the sensor pad, the method comprising:
initiating a scanning operation when user's fingertip is in direct contact with the ring when the ring is coupled to a system ground level greater than earth ground;
reading a first signal from a capacitive sensing element of the array of individual capacitive sensing elements when a sensor pad supply voltage supplied to the sensor pad is in a low state relative to a sensor pad ground reference voltage; and
reading a second signal from the capacitive sensing element when the sensor pad ground reference voltage is supplied to the sensor pad and is greater than the system ground level.

14. The method as in claim 13, further comprising:
ending the scanning operation; and
transitioning the sensor pad supply voltage to the low state.

15. The method as in claim 14, wherein the sensor pad ground reference voltage is equal to the system ground level when the sensor pad supply voltage is in the low state.

16. The method as in claim 14, wherein the sensor pad and ring are both located beneath a surface.

17. The method as in claim 16, wherein the surface is a top surface of a button of a mobile device.

* * * * *